(12) United States Patent
Delaire

(10) Patent No.: US 11,544,171 B2
(45) Date of Patent: Jan. 3, 2023

(54) METHOD FOR MONITORING THE FREE SPACE OF A MEMORY STACK

(71) Applicants: Continental Automotive France, Toulouse (FR); Continental Automotive GmbH, Hannover (DE)

(72) Inventor: Jacques Delaire, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 461 days.

(21) Appl. No.: 16/647,760

(22) PCT Filed: Jun. 26, 2018

(86) PCT No.: PCT/FR2018/051548
§ 371 (c)(1),
(2) Date: Mar. 16, 2020

(87) PCT Pub. No.: WO2019/002746
PCT Pub. Date: Jan. 3, 2019

(65) Prior Publication Data
US 2021/0133077 A1    May 6, 2021

(30) Foreign Application Priority Data
Jun. 26, 2017  (FR) ...................................... 1755836

(51) Int. Cl.
*G06F 12/02* (2006.01)
*G06F 11/34* (2006.01)
*G06F 11/30* (2006.01)

(52) U.S. Cl.
CPC ...... *G06F 11/3471* (2013.01); *G06F 11/3037* (2013.01); *G06F 12/0238* (2013.01)

(58) Field of Classification Search
CPC ............. G06F 11/3471; G06F 11/3037; G06F 12/0238; G06F 11/3013; G06F 9/5016
(Continued)

(56) References Cited

U.S. PATENT DOCUMENTS 5,490,269 A * 2/1996 Cohn ........................ G06F 7/24
6,630,668 B1 * 10/2003 Cramer ................... H01J 37/28
250/311

(Continued)

FOREIGN PATENT DOCUMENTS

DE   10036278 A1 *  2/2002  .......... G06F 11/3636
DE   10036278 A1      2/2002
(Continued)

OTHER PUBLICATIONS

International Search Report and Written Opinion for International Application No. PCT/FR2018/051548, dated Aug. 29, 2018, 11 pages.

*Primary Examiner* — Albert Decady
*Assistant Examiner* — Enam Ahmed
(74) *Attorney, Agent, or Firm* — RatnerPrestia

(57) ABSTRACT

A method for monitoring the free space of a stack of a microcontroller during the execution of a process using spaces of the stack from a start address to an end address of the stack, in which the method includes: in a prior step, writing N keys in the stack at N addresses of the stack, the memory space between two consecutive keys decreasing in a direction from the start address to the end address of the stack; and, in a step of executing the process, saving the address of the current key, corresponding to the address of the existing key, among the N keys, that is closest to the stack start address.

7 Claims, 3 Drawing Sheets

(58) Field of Classification Search
USPC .............................................. 714/1
See application file for complete search history.

(56) References Cited

U.S. PATENT DOCUMENTS

| | | | | |
|---|---|---|---|---|
| 7,562,230 | B2* | 7/2009 | Komarla | G06F 3/0623 |
| | | | | 380/37 |
| 7,712,084 | B2 | 5/2010 | Beuten et al. | |
| 8,005,996 | B2* | 8/2011 | Bondurant | G06F 21/80 |
| | | | | 711/170 |
| 2008/0222446 | A1* | 9/2008 | Yasaki | G06F 11/324 |
| | | | | 714/1 |
| 2014/0359246 | A1* | 12/2014 | Park | G06F 3/0653 |
| | | | | 711/170 |
| 2016/0124841 | A1* | 5/2016 | Nito | G06F 3/0659 |
| | | | | 711/102 |
| 2017/0317922 | A1* | 11/2017 | Livak | H04L 12/54 |
| 2018/0089427 | A1* | 3/2018 | Branco | H04L 9/14 |

FOREIGN PATENT DOCUMENTS

| | | | |
|---|---|---|---|
| JP | 04266141 | A | 9/1992 |
| JP | 2009020806 | A * | 1/2009 |
| JP | 2009020806 | A | 1/2009 |

* cited by examiner

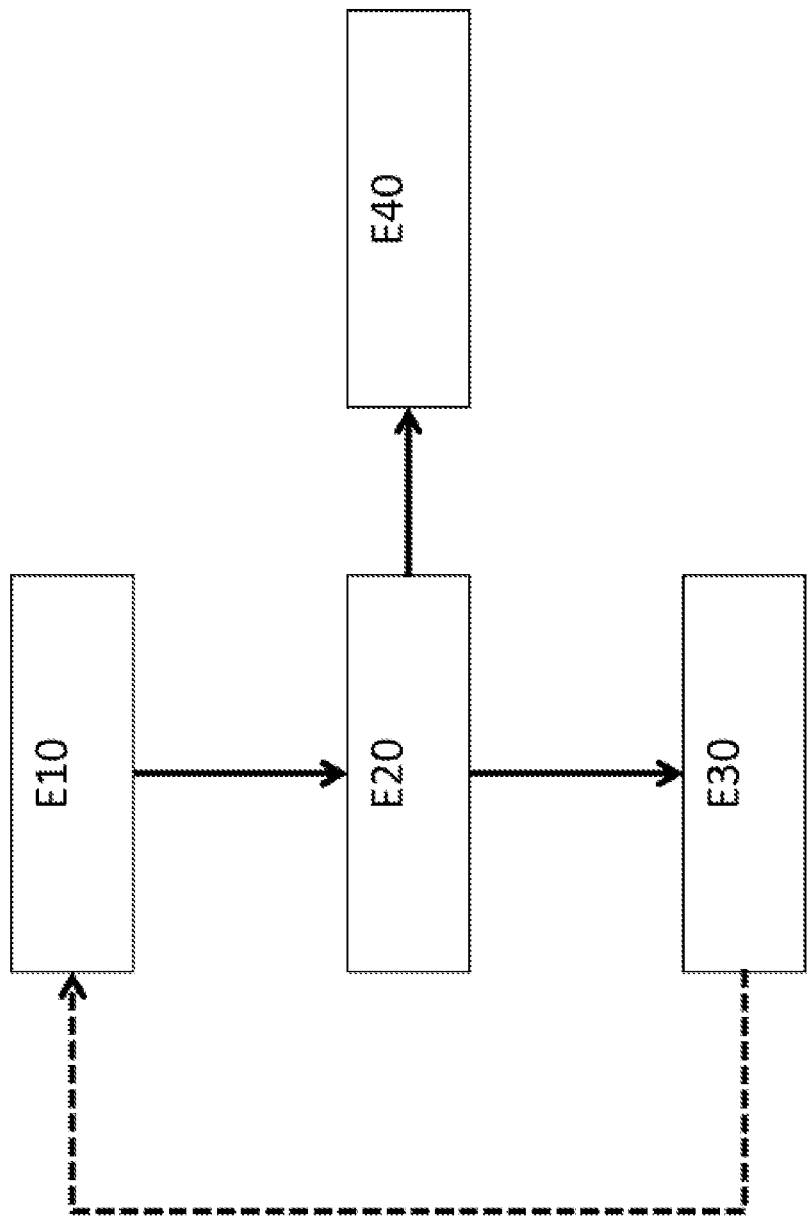

METHOD FOR MONITORING THE FREE SPACE OF A MEMORY STACK

CROSS REFERENCE TO RELATED APPLICATIONS

This application is the U.S. National Phase Application of PCT International Application No. PCT/FR2018/051548, filed Jun. 26, 2018, which claims priority to French Patent Application No. 1755836, filed Jun. 26, 2017, the contents of such applications being incorporated by reference herein.

FIELD OF THE INVENTION

The invention relates to the field of management of a microcontroller stack.

More particularly, it relates to a method for monitoring the free space of a microcontroller stack during the execution of a process.

BACKGROUND OF THE INVENTION

In the case of embedded, real-time systems, these systems must meet design constraints which make it possible to meet needs, while limiting additional costs. Thus, these systems often have limited memory space and optimized computing powers for the execution of predefined tasks. Generally, these systems also respond to operational safety constraints, said to be critical, for which they must not be subject to failure, that is to say, always make it possible to obtain accurate, relevant results within expected timeframes.

Most microcontrollers of embedded systems natively manage a stack per process (that is to say, a program in execution). The stack corresponds to an area of volatile memory, said area being limited in size, usually determined at the start of the program. A stack is allocated to the execution of a process and is used, in particular, to manage subroutine calls, passing parameters and variables. The size of the execution stack depends on many factors, including the programming language, the processor architecture, the amount of random access memory (RAM) available, etc.

A stack overflow is a malfunction caused by a process which, while writing in a stack, writes outside the space allocated to the stack, thus overwriting information needed for the process. This generally results in an interruption of the program.

To avoid such problematic situations, a known solution is to use theoretical calculations when designing an embedded system in order to evaluate the amount of memory consumed in the case of process executions corresponding to limited theoretical scenarios. These scenarios most often lead to a large overestimation of the stack size required, leading to a design cost overrun.

There are also known methods of detecting the capacity of a stack 100, as illustrated in FIG. 1. In such methods, a 110/120 key (numerical value, character strings) is initialized at each end of the stack. During the execution of a process using stack 100, it is determined whether keys 110 and/or 120 have been reached by verifying that the keys are always present at each end of the stack. Otherwise, the process is reinitialized to recover a known and safe execution state of the process in order to avoid unexpected behavior of the system. However, such a method disrupts the execution during the process.

SUMMARY OF THE INVENTION

Therefore, a method making it possible to estimate the optimal size of a stack in a way that is precise and consuming little processor resources needs to be proposed in order to allow optimal management of memory resources, in particular in the case of embedded systems where said resources are particularly limited.

According to a first aspect, the present invention relates to a method for monitoring the free space of a microcontroller stack, wherein said method comprises:

in a prior step, writing N keys in the stack at N addresses of said stack, the memory space between two consecutive keys decreasing in a direction from the start address to the end address of the stack;

in a process execution step, saving the address of the current key, corresponding to the address of the existing key, among the N keys, that is closest to the stack start address.

Therefore, said method makes it possible to optimally monitor the occupancy of the stack, the number of keys being greater at the end of the stack than at the start thereof. In addition, this monitoring method does not consume more processor resources than the standard method described above.

Advantageously, but optionally, the method according to an aspect of the invention can also comprise at least one of the following characteristics:

the method involves writing two keys at each end of the stack;

the address of the i-th key from a predefined address of a first key A(1) I, varying from 2 to N, is equal to the whole part of $$\left( \frac{2^{i-1} - 1}{2^{i-1}} \times (SS - (A(1) - SSA)) \right)$$

where SS is equal to the size of the stack, SSA is the start address of the stack.

The method comprises a step consisting in comparing the address of the current key to the address of a maximum key corresponding to an address of the stack, and, in the case where the address of the current key is closer to the end address than to the address of the maximum key, the index of said maximum key takes the value of the index of the current key;

the index of the maximum key is stored in a non-volatile memory area;

the addresses of the keys are stored in a data table; and an index to the data table corresponds to a key address.

According to a second aspect, the invention relates to a computer program product intended to be executed by processing means of a computing unit, said computing unit further comprising a memory, and configured for implementing the method as defined in the preceding characteristics.

BRIEF DESCRIPTION OF THE DRAWINGS

Other Characteristics and Advantages Will Appear Upon Reading the Description of the Following Embodiment. This Description Will be Given with Reference to the Accompanying Drawings in which:

FIG. 3 schematically illustrates a method for controlling the free space of a microcontroller stack during the execution of a process according to an embodiment of the invention.

DETAILED DESCRIPTION OF THE PREFERRED EMBODIMENTS

Figure 1:
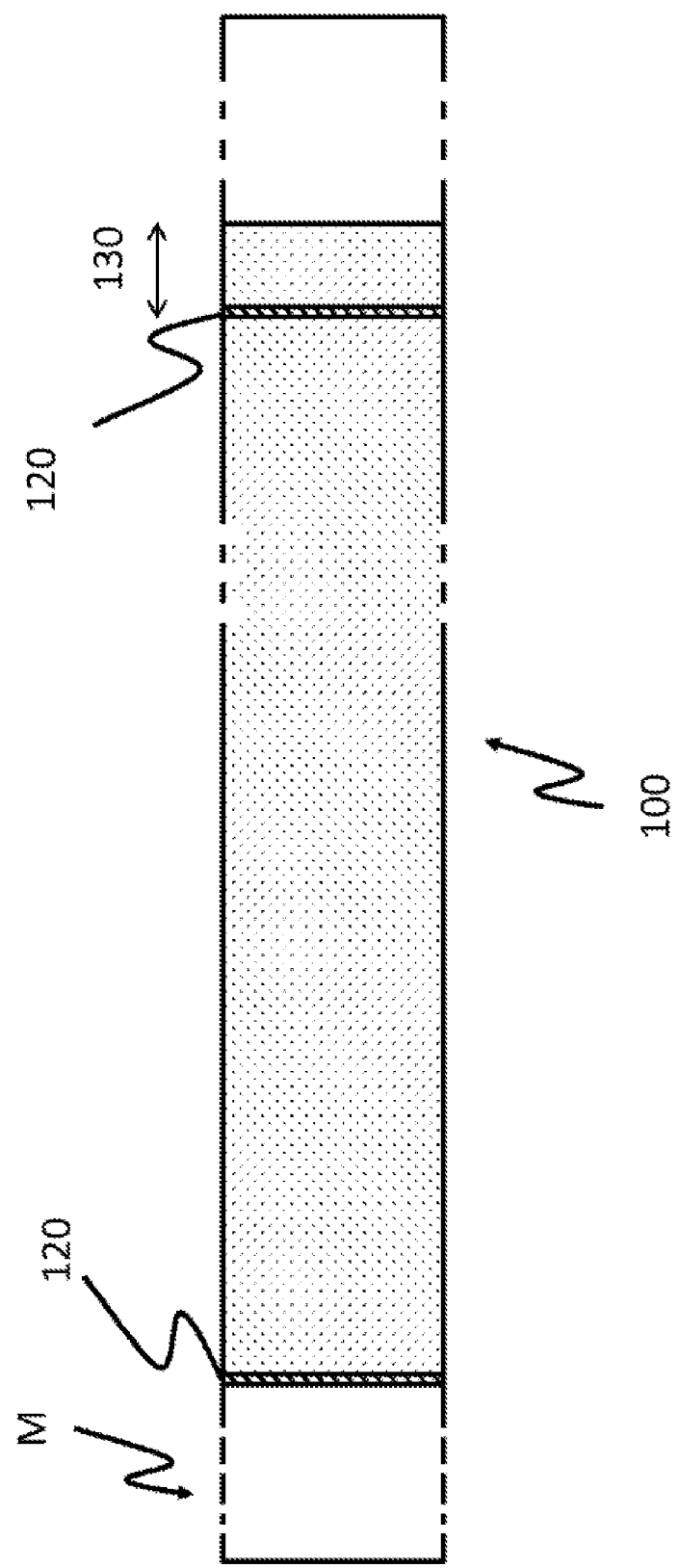
FIG. 1, already presented, schematically illustrates a microcontroller stack according to an embodiment of the prior art.
Figure 2:
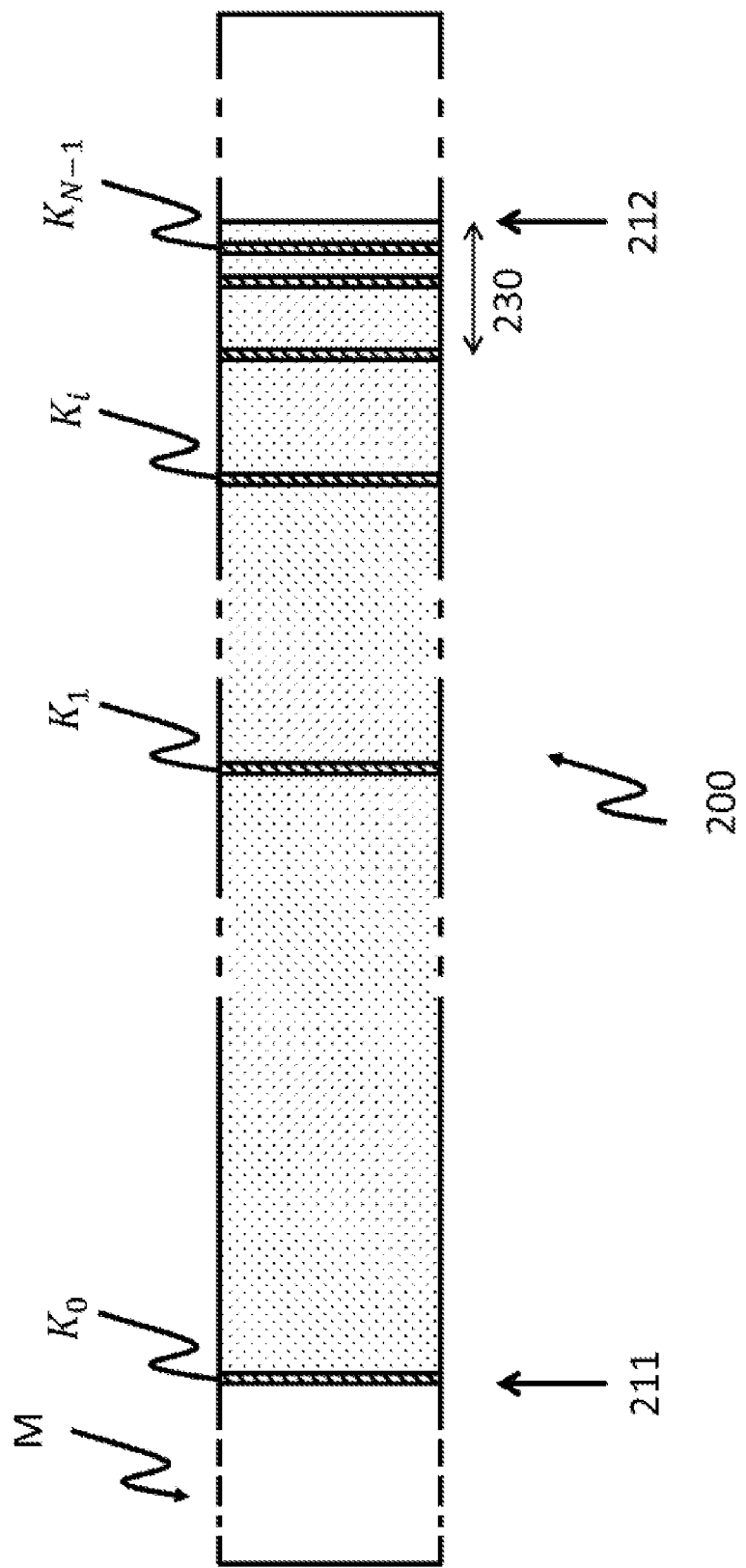
FIG. 2 schematically illustrates a microcontroller stack according to an implementation mode of an aspect of the invention.

FIG. 2 illustrates a stack 200 of a microcontroller such as implemented according to an embodiment of the invention. The stack 200 is defined in a random access memory M by a start address 211 and an end address 212 of the stack 200.

During the execution of a process using the stack 200, a method for monitoring the free space of said stack 200 makes it possible to monitor the use of the memory space.

FIG. 3 illustrates steps of such a monitoring method.

In a step E10, called initialization, prior to the execution of the process, the stack being empty, a plurality N+2 of keys $K_i$ (considering $0 \leq i < N+1$) is positioned in stack 200, by writing specific predetermined initialization values, at N+1 separate addresses $A_i$, the keys $K_0$ and $K_{N+1}$ being those of the standard process guaranteeing that the limits of the stack have never been exceeded. Ideally, the positioning is carried out in such a way that the keys $K_i$ are more present at the end of the stack than at the start of the stack. Thus, going from the start address 211 to the end address 212 of the stack, the memory space separating two consecutive keys decreases. This distribution of keys allows a gradual meshing of the stack. Consequently, a larger meshing of the margin area 230 of the stack is obtained. As explained above, this margin area 230 allows to be informed that the free space of the stack is becoming limited, while still keeping a certain number of usable addresses in the RAM.

In a preferred embodiment, the distribution of the keys $K_i$ is performed according to an exponential distribution law. For example, the keys are written to addresses of the stack according to the law $$A(i) = A(1) + \left( \frac{2^{i-1} - 1}{2^{i-1}} \times (SS - (A(1) - SSA)) \right)$$

where A(i) represents the address of the i-th key $K_i$, SSA the start address of the stack, and SS the size of the stack and i varying from 2 to N. Following the writing of the N+2 initialization values, still in step E10, the first key (corresponding to A(1)) is saved and corresponds to a current index CI. The address of the first key A(1) is ideally defined by an address such that that the size of the stack remaining free is considered acceptable and safe. Thus, the address of the key may be set to half the stack, or, for example, to 70% or 80% of the stack size.

Ideally, the number of keys $K_i$ is understood and determined according to the size of the stack and the desired final granularity which is equal to the size of the last space determined by the keys, namely $$\frac{(SS - (A(1) - SSA))}{2^{N-1}}$$

for N keys.

In a step E20, during the execution of a process using stack 200, at regular intervals (ideally, at the smallest of the recurrences of all the processes managed by a system executing said processes), the first key is verified. Thus, at address A(1), the method verifies that the initialization value of the first key is present. In the case where the value is changed, the process has therefore used the space of the stack up to the level of the current key, which means that the key has been reached. In the case where the value is unchanged, the key has not been reached. If the key has been reached, the method verifies that the next key has not been reached, and so on until detecting a key $K_i$ not reached. The i-th key thus determined is saved and the value of the current index CI is updated to correspond to this key.

The address of a key $K_i$ can be automatically calculated or, ideally, during initialization, the addresses of the keys $K_i$ are stored in a data structure, such as a table, for example, the indices of the table being matched with the indices i of the keys.

In a step E30, when the last key $K_{N+1}$ is reached or if the key $K_0$ has been corrupted, as for the standard method, a reinitialization of the process is triggered to find a stable and safe state of execution of the process. This reinitialization also entails reinitializing the stack 200. Thus, step E10 of key distribution and reinitialization of the current index CI is carried out again.

In a step E40, a maximum index value MI is also saved. When the stack is initialized for the first time, for example, following the first power-up of a system executing the process, MI is equal to the current index CI. Thereafter, when the value of the current index CI is updated, the method verifies that this value is not greater than the value of the maximum index MI. If this value is higher, MI is updated with the value of the current index CI. The maximum index MI is saved in a non-volatile memory area, for example, a non-volatile RAM memory (NVRAM). Thus, during the reinitialization of the stack following the reinitialization of the process caused in a step E30, the value of the maximum index MI is not affected.

The maximum index MI can be recovered in a later step, thus allowing verification of the measurement of the stack size remaining free. This remaining free size TL is between and TLinf(MI) and TLsup(MI) such that TLinf(MI) $\leq$ TL $<$ TLsup(MI) with $$TLinf(MI) = \frac{2^{MI-1} - 1}{2^{MI-1}} \times (A(1) - SSA) \text{ and}$$

$$TLsup(MI) = \frac{2^{MI} - 1}{2^{MI}} \times (A(1) - SSA)$$

for MI>1 and TLinf(1)=SS and TLsup(1)=A(1)−SSA.

Consequently, by implementing this monitoring method, it is possible to determine with precision a maximum amount of memory used during, for example, the design phases of an embedded system. Therefore, the stack size can optimally be defined. In addition, the use of such a method uses few processor resources, allowing the use of these resources for other tasks.

The invention claimed is:

1. A method for monitoring free space of a stack of a microcontroller during execution of a process using spaces of said stack from a start address to an end address of the stack, in which said method comprises:

in a prior step, writing N keys, in the stack at N addresses of said stack, the memory space between any two consecutive keys of the N keys gradually decreases as each of the N keys are written in addresses closer to the end address of the stack;

in a step of executing the process, saving the address of the current key, corresponding to the address of the existing key, among the N keys, that is closest to the start address of the stack; and comparing the address of the current key to the address of a maximum key corresponding to an address of the stack, and, in the case where the address of the current key is closer to the end address than the address of the maximum key, the address of said maximum key takes the value of the address of the current key.

2. The method for monitoring the free space of a stack according to claim 1, wherein from a predefined address of a first key A(1), the address of the i-th key, i varying from 2 to N, is equal to the whole part of $$\left(\frac{2^{i-1}-1}{2^{i-1}} \times (SS - (A(1) - SSA))\right),$$

where SS is equal to the size of the stack, SSA being the start address of the stack.

3. The method for monitoring the free space of a stack according to claim 1, wherein said method further comprises writing two keys at each end of the stack.

4. The method for monitoring the free space of a stack according to claim 3, wherein the address of the maximum key is stored in a non-volatile memory area.

5. The method for monitoring the free space of a stack according to claim 1, wherein the addresses of the keys are stored in a data table.

6. The method for monitoring the free space of a stack according to claim 5, wherein an address of an i-th key is accessible by its index i in the data table.

7. A non-transitory computer program product, intended to be executed by a processing means of a calculation unit, said calculation unit further comprising a memory, and said program configured for the implementation of the method of claim 1.

\* \* \* \* \*